May 28, 1946. F. TRICOLI 2,400,894
AIR ATTACHMENT FOR RIVET HEATERS
Filed July 27, 1944
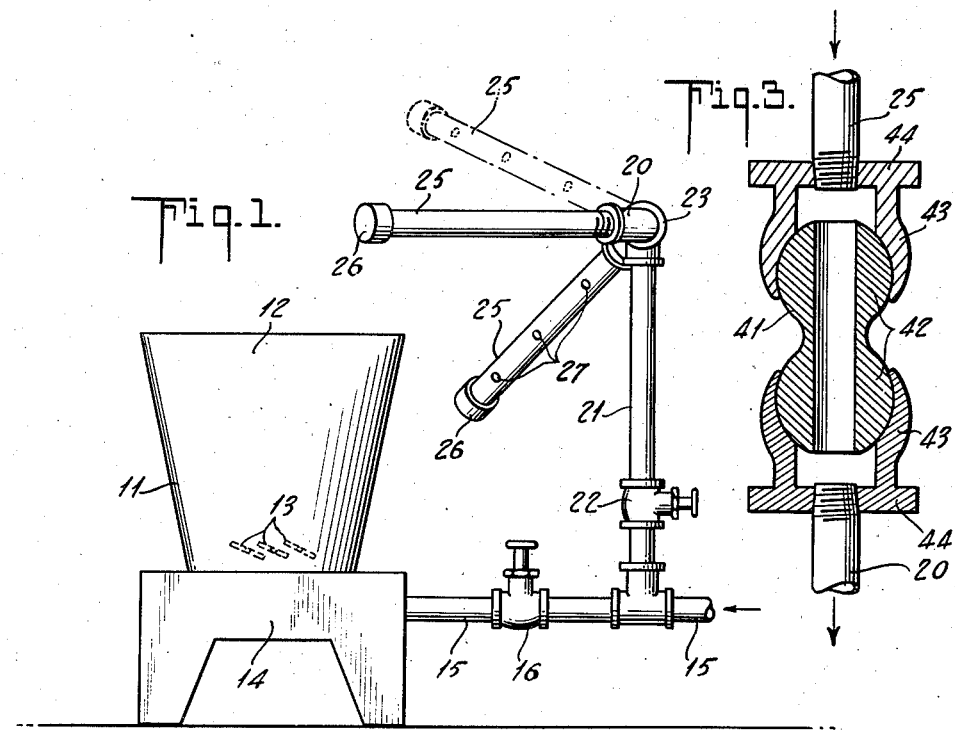
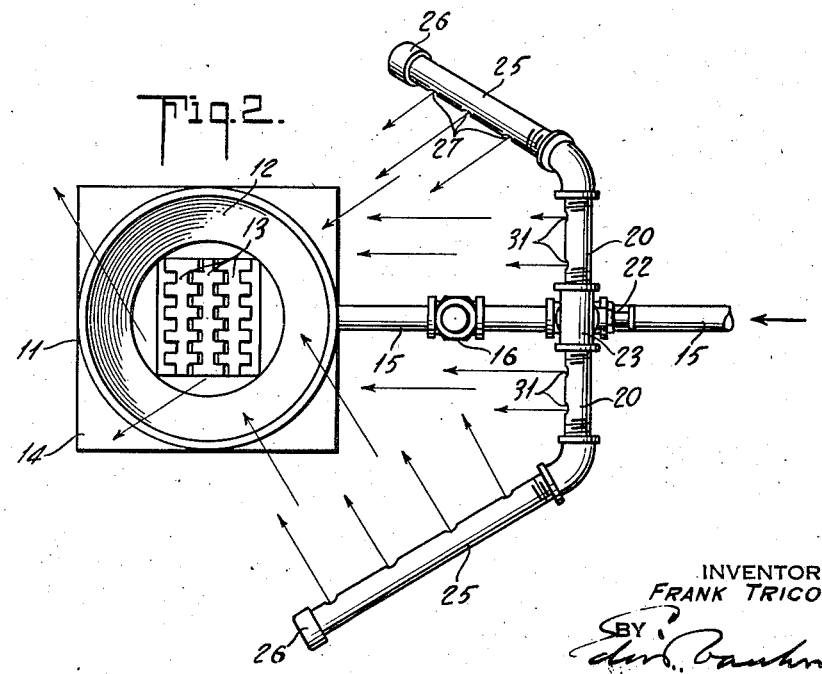
INVENTOR
FRANK TRICOLI Patented May 28, 1946

2,400,894

UNITED STATES PATENT OFFICE 2,400,894

AIR ATTACHMENT FOR RIVET HEATERS

Frank Tricoli, Hoboken, N. J.

Application July 27, 1944, Serial No. 546,834

3 Claims. (Cl. 263—50)

This invention relates to attachments for rivet heaters, more particularly to a device for supplying air above the fire pot to protect the operator from the spitting of the hot slate particles when cold rivets are dumped on the hot fire.

The object of my device is to direct cross currents of cold air in several directions across the space between the fire pot and the operator to cut off the heat ray from burning the operator and to deflect the fine hot slate particles that might otherwise cause serious burns on the nose, throat and skin of the worker.

After standard rivet heaters are in use for a short period of time, the pot becomes red hot and the air surrounding the pot becomes intolerable causing not only discomfort to the operator but in many cases the start of permanent disability. The hot fire pot spits and sputters when cold rivets are placed on the fire and the fine particles of slate in the coal fly out burning seriously the nose, throat and skin of the operator.

The prime object of this invention is to produce a device that will relieve these faults and thereby make working conditions more comfortable and desirable.

The foregoing and other features of my invention will now be described in connection with the accompanying drawing forming part of this specification in which I have represented my attachment for rivet heaters in its preferred form, after which I shall point out in the claims those features which I believe to be new and of my own invention.

In the drawing:

Figure 1 is a side elevation, in part section, of my attachment in its preferred form, shown connected in an air line of a standard rivet heater.

Figure 2 is a top view of same.

Figure 3 is an enlarged detail in part section showing the universal coupling which I may employ to provide universal movement of the arms.

In the carrying out of my invention I use a standard rivet heater 11 having the usual fire pot 12, coal grate 13, mounted on standard base 14. Air is supplied the fire bed through a pipe line 15 from a source of supply not shown which may be regulated by means of the valve 16.

I prefer to use standard pipe and fittings as shown in Figures 1 and 2 in which the horizontal pipe line 20 is supported by a vertical pipe 21 which is connected directly to the pipe line 15 and through that line to a source of air supply. I provide a valve 22 to regulate the flow of air to the pipe 20. In the side of the pipe 20 I provide a line of openings 31. Inasmuch as the pipe 20 is loosely mounted in fitting 23 the line of holes 31 may be varied around the horizontal axis the entire 360°.

On both ends of the pipe line 20 I mount extension arms 25 at an angle to the axis of the pipe 20. These arms are plugged on their outer ends 26 and provided with a line of openings 27 through one side thereof. These arms 25 forming the extension may also be turned around their longitudinal axes with the result that stream of air leaving the holes 27 may be directed to cross the streams of air leaving the horizontal pipe 20 at any converging angle with respect to each other as indicated by the arrows in Figure 2, completely blanketing the space between the fire pot and the operator.

This screen not only cools the workman but it deflects any small particles of slate that might might have a tendency to fly off the fire bed.

In Figure 3, I show a detail of a universal joint which I employ to provide universal movement of the extension arms with respect to the main section thereby obtaining better control of the cross currents of air delivered over the fire. In that construction I provide a main piece 41 consisting of a connection in the shape of two integral spheres 42. Adapted to ride on each spherical surface of this connection, I provide suitable fitting 43 provided with flange 44 or other convenient means for attaching to the pipe 25, and to the pipe 20.

The supply of air is controlled by means of the manually operated valve 22.

It will be readily understood that the stream of air flowing out of the openings 27 in the arm 25 will cross the stream flowing out of the openings 31 in the horizontal member 20. When the lines of these holes are all in line the cross currents completely blanket the space above the fire. By turning the pipe 20 about its horizontal axis the air can be directed to or away from the fire, and by swinging the arms 25 about its universal connection the air coming out of the line of openings can be directed to any place desired, even to directing the air directly on the workman to relieve a temporary over-heated condition.

I wish it distinctly understood that my attachment for rivet heater hereinabove described and illustrated is in the form in which I desire to construct it and that changes or variations may be made as may be desirable or convenient without departing from the salient features of my invention and I therefore intend the following claims to cover such modifications as naturally fall within the lines of invention.

I claim:

1. A device of the class described in combination, a horizontal hollow member provided with a line of openings through one side thereof, said horizontal member connected to the air supply line of a rivet heater so that the openings may be directed to deliver air in a sheet over the heater, hollow members each provided with a line of openings through the side thereof and movably connected to the horizontal member so that streams of air passing out of the openings may be directed in any desired angle with respect to the stream of air passing out of the openings in the horizontal member, whereby a plurality of sheets of air are blown across the heater away from the workman.

2. A device of the class described in combination, a horizontal hollow member provided with a line of openings through one side thereof, means to rotate the openings around the longitudinal axis of the horizontal member, said horizontal member connected to the air supply line of a rivet heater so that the openings may be directed to deliver a sheet of air over the heater, hollow members each provided with a line of openings through the side thereof and movably connected to the horizontal member so that streams of air passing out of the openings may be directed in sheets in any desired angle with respect to the stream of air passing out of the openings in the horizontal member.

3. A device of the class described in combination, a horizontal hollow member provided with a line of openings through one side thereof, said horizontal member connected to the air supply line of a rivet heater so that the openings may be directed to deliver air in a sheet over the heater, hollow members each provided with a line of openings through the side thereof and movably connected to the horizontal member so that streams of air passing out of the openings may be directed in sheets in any desired angle with respect to the stream of air passing out of the openings in the horizontal member, means to regulate the amount of air delivered to the hollow member.

FRANK TRICOLI.